United States Patent
Jung et al.

(10) Patent No.: US 9,063,668 B1
(45) Date of Patent: Jun. 23, 2015

(54) DISTRIBUTED MEMORY ALLOCATION IN MULTI-THREADED PROGRAMS

(75) Inventors: Changhee Jung, Atlanta, GA (US);
Silvius V. Rus, Orinda, CA (US);
Ahmad Sharif, Mountain View, CA (US)

(73) Assignee: Google Inc., Mountain View, CA (US)

( * ) Notice: Subject to any disclaimer, the term of this patent is extended or adjusted under 35 U.S.C. 154(b) by 343 days.

(21) Appl. No.: 13/558,246

(22) Filed: Jul. 25, 2012

(51) Int. Cl.
*G06F 3/06* (2006.01)
*G06F 9/50* (2006.01)
*G06F 17/30* (2006.01)

(52) U.S. Cl.
CPC .......... *G06F 3/0658* (2013.01); *G06F 9/5016* (2013.01); *G06F 17/30312* (2013.01)

(58) Field of Classification Search
USPC .......... 711/114, 148, E12.001, 147, 129, 151, 711/158
See application file for complete search history.

(56) References Cited

U.S. PATENT DOCUMENTS

| | | | |
|---|---|---|---|
| 6,848,033 B2* | 1/2005 | Joseph | 711/147 |
| 2002/0199069 A1* | 12/2002 | Joseph | 711/147 |
| 2013/0151783 A1* | 6/2013 | Ansaloni et al. | 711/130 |

* cited by examiner

*Primary Examiner* — Mardochee Chery
(74) *Attorney, Agent, or Firm* — Fish & Richardson P.C.

(57) ABSTRACT

Methods, systems, and apparatus, including computer programs encoded on a computer storage medium, for distributed memory allocation. The system identifies a consumer thread which allocates substantially more memory blocks than it deallocates and a producer thread which deallocates substantially more memory blocks than it allocates. The system establishes a dedicated channel for direct allocation and deallocation between the consumer thread and the producer thread.

27 Claims, 4 Drawing Sheets

DISTRIBUTED MEMORY ALLOCATION IN MULTI-THREADED PROGRAMS

BACKGROUND

This specification relates to memory management, and particularly, to sharing memory between threads of an executing process. Memory management provides ways to dynamically allocate portions of memory to the process and its individual threads at their request, and to free the portions of the memory for reuse when the memory blocks are no longer needed by the threads. Different algorithms can be used to implement the dynamic memory allocation. The choice of the memory allocation algorithm can influence how efficiently the memory is used and, as a result, impacts efficiency of the process over all.

SUMMARY

In general, one aspect of the subject matter described in this specification can be embodied in methods that include the actions of executing a process on the data processing apparatus, identifying a consumer thread which allocates more memory blocks than it deallocates, and a difference between measures of memory block allocation and deallocation is beyond a first threshold; identifying a different producer thread which deallocates more memory blocks than it allocates, and a difference between measure of memory block deallocation and allocation is beyond a second threshold; establishing a first channel between the consumer thread and the producer thread through which references to deallocated memory blocks of the producer thread can be sent to the consumer thread; configuring the producer thread to subsequently deallocate memory blocks by sending references to the memory blocks to the consumer thread using the first channel instead of using the global memory manager to deallocate the memory blocks; and configuring the consumer thread to subsequently allocate memory blocks using the references to the memory blocks provided on the first channel by the producer thread instead of using the global memory manager to allocate the memory blocks. Other embodiments of this aspect include corresponding systems, apparatus, and computer programs.

These and other aspects can optionally include one or more of the following features. The memory blocks are fixed length or variable length. The method can further include determining measure of memory block deallocation and allocation for the threads. The measure of memory block deallocation can be a rate of deallocation of the thread, a rate of memory usage of the thread, a number of memory blocks deallocated by the thread, or a difference between the number of memory blocks deallocated by the thread and the number of memory blocks allocated by the thread. The measure of memory block allocation of the thread can be a rate of allocation of the thread, a rate of memory usage of the thread, a number of memory blocks allocated by the thread, or a difference between the number of memory blocks allocated by the thread and the number of memory blocks deallocated by the thread. The method can further include determining transfer rate of the channel.

Other methods can include selecting threads having its measure of memory block deallocation greater than its measure of memory block allocation; determining production rates for each of these threads; and identifying the thread with the highest production rate as a producer thread. Also, the methods can include selecting threads having its measure of memory block allocation greater than its measure of memory block deallocation; determining consumption rates for each of these threads; and identifying the thread with highest consumption rate as the consumer thread.

Particular embodiments of the subject matter described in this specification can be implemented to realize one or more of the following advantages. The direct allocation and deallocation of the memory blocks between the producer and consumer threads can decrease idle time of a memory block being sent through the channel. The direct allocation and deallocation of the memory blocks can also decrease the volume of memory block allocations and deallocations performed by the global memory manager thereby increasing its responsiveness to memory requests.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
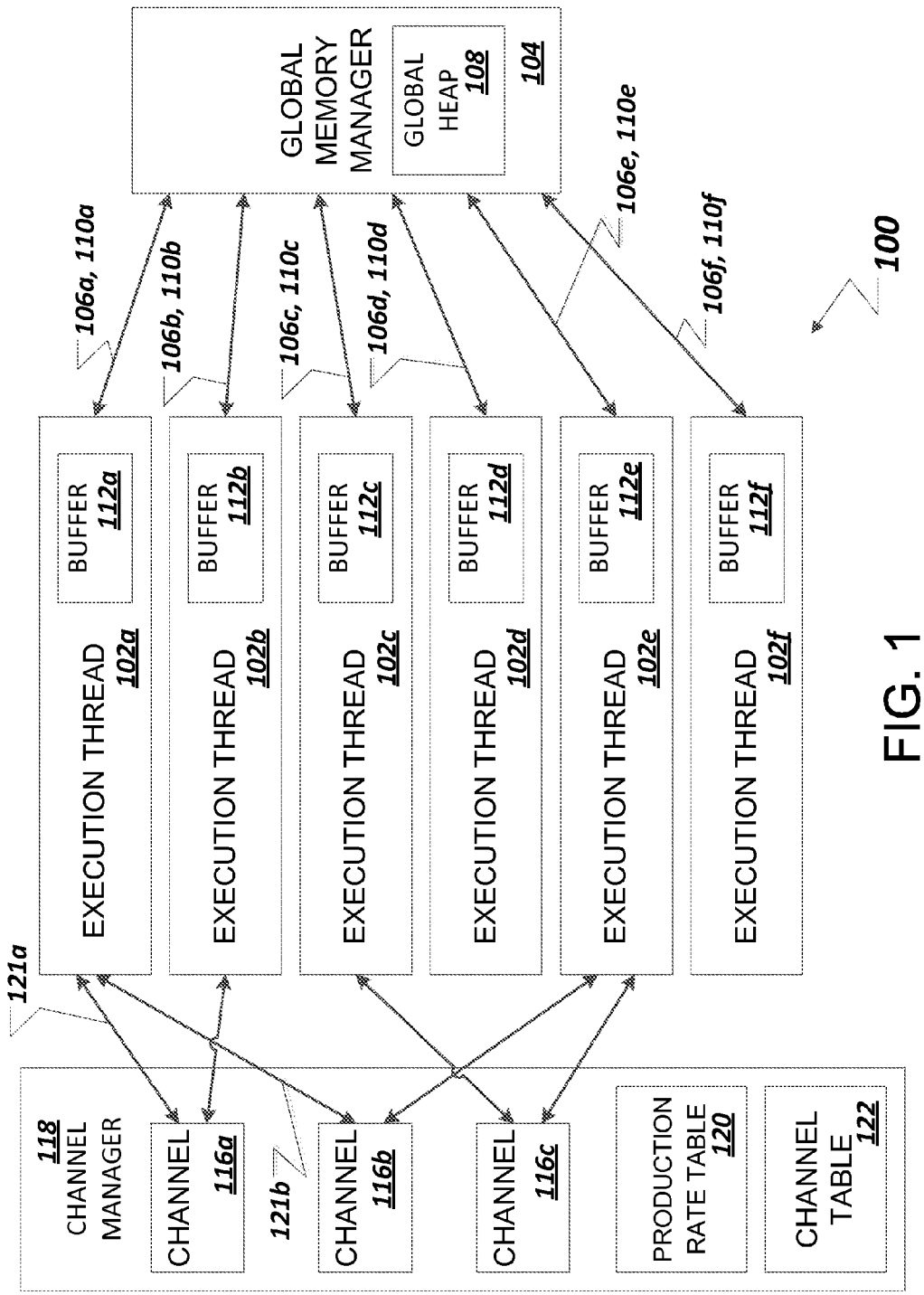
FIG. 1 illustrates an example multi-threaded process.

FIG. 1 illustrates an example multi-threaded process 100. The process 100 is an instance of a computer program that is executed by one or more data processing apparatus (e.g., one or more servers). A multi-threaded process comprises one or more threads 102a-f. A thread is a sequence of instructions that may execute in parallel with other threads in the process. Threads can share resources of the process and the data processing apparatus such as, for example, memory, processor time, and processor cache.

A Global Memory Manager (GMM) 104 is a software component of the process 100 that can be used by the threads 102 to allocate and deallocate memory blocks for the process 100. The GMM 104 performs memory allocation and deallocation functions using a global heap 108. The heap 108 is a pool of unused memory blocks that are not being used by the threads 102 and are available to be allocated to threads needing additional memory. By way of illustration, when one of the threads (e.g., 102b) needs additional memory, the thread 102b sends a request 106b to the GMM 104. In response, the GMM 104 allocates to the thread 102b one of the memory blocks from the heap 108 by sending the address of the memory block in the heap 108 to the thread 102b and marking the memory block as allocated. When the thread 102b no longer needs a particular memory block, it sends a request 110b to the GMM 104 to deallocate this memory block by marking it as free in the heap 108. Sometimes the GMM 104 can allocate memory blocks of specific size specified by the requesting thread. In other implementations, the memory blocks are all of the same size.

Very often threads 102 allocate substantially more memory blocks than they deallocate or deallocate substantially more memory blocks than they allocate. Such imbalance in memory block allocation and deallocation is addressed by creating dedicated channels for allocating and deallocating memory blocks between complementary imbalanced threads.

In order to identify the threads 102 having an imbalance of allocations and deallocations of the memory blocks, the system calculates a measure of memory block allocation and a measure of memory block deallocation for at least some of the threads. There are two types of threads having imbalance of memory block allocation and deallocation: consumer threads and producer threads. A consumer thread is a thread that allocates more memory blocks than it deallocates over time, and the difference between the number of memory blocks being allocated and the number of memory blocks being deallocated is above a so-called consumer threshold. A producer thread is a thread that deallocates more memory blocks than it allocates over time, and the difference between the number of memory blocks being allocated and the number of memory blocks being deallocated is below a so-called producer threshold. In some implementations the producer threshold and the consumer threshold are preset in the system. In other implementations the producer threshold and the consumer threshold are adjustable by the system or by a user based on system performance indicators or for other reasons.

In some implementations the measure of allocation and the measure of deallocation of the thread are a rate of allocation and a rate of deallocation of the thread, respectively. A rate of allocation of a thread is a ratio of a number of memory blocks being allocated to the thread during a period of time to the length of the period of time. A rate of deallocation of a thread is a ratio of a number of memory blocks being deallocated by the thread during a period of time to the length of the period of time.

In such case a thread is identified as a consumer thread when the difference between the rate of allocation and the rate of deallocation of that thread exceeds the consumer threshold, and a thread is identified as a producer thread when the difference between the rate of deallocate and the rate of allocation of that thread exceeds the producer threshold.

In various implementations, the rate of allocation of a thread is calculated using a circular allocation buffer 112. A circular buffer is a data structure that uses a single, fixed-size buffer as if it were connected end-to-end. For each allocation event performed by the thread, the circular allocation buffer records a time of the event and the number of memory blocks allocated to the thread during the event. If the circular buffer 112 has the length N, it contains information regarding the last N allocation events. To calculate the allocation rate of the thread (e.g. 102b), the number of memory blocks allocated in the last N events recorded in the circular buffer (e.g. 112b) is summed up. Also, the length of time between the latest and the earliest allocation event recorded in the buffer is calculated. The rate of allocation is then calculated as a ratio of the sum of the allocated memory blocks to the calculated length of time.

Similarly, in some implementations, the rate of deallocation of a thread is calculated using a circular deallocation buffer (e.g. 112a) of the length M for recording information about the last M deallocation events performed by the thread (e.g. 102a). The rate of deallocation is determined by dividing the sum of the number of memory blocks being deallocated during the deallocation events recorded in the deallocation buffer by the length of the period of time between the latest and the earliest recorded event in the deallocation buffer. M and N can be equal.

Alternatively, one circular buffer (e.g. 112a) can be used to record information about both the allocation and the deallocation events. In this implementation, the number of blocks being allocated is recorded as a positive number and the number of blocks being deallocated is recorded as a negative number or vice-versa. Such a buffer can be used to calculate a rate of memory usage for the thread (e.g. 102a). A rate of memory usage is a difference between a number of blocks being allocated and the number of blocks being deallocation by the thread in relation to the period of time during which the allocations and the deallocations happened. The rate of memory usage is calculated by summing up the number of memory blocks being allocated or deallocated in the events recorded in the buffer, respectively positive or negative, determining the length of time between the latest and the earliest events recorded in the buffer, and calculating a ratio of the sum to the length of time.

In other implementations, for each thread 102 the system calculates the measures of allocation and deallocation using counters. For example, the global memory manager 104 or the individual threads 102a-f can maintain the counters. In accordance with some implementations, the counter is an allocation counter. An allocation counter computes the difference between the number of memory blocks allocated to a particular thread (e.g., thread 102e) and the number of memory blocks deallocated by that thread. In other words, the allocation counter equals the number of allocated blocks minus the number of deallocated blocks.

When a thread (e.g., thread 102b) allocates (or deallocates) one or more memory blocks, the allocation counter increases (or decreases) its value by the number of memory blocks involved. In accordance with some implementations, when the allocation counter of a thread exceeds the consumer threshold, the thread (e.g., thread 102b) is identified as a consumer thread. In accordance with some implementations, when the allocation counter of a thread falls below the producer threshold, the thread (e.g., thread 102a) is identified as a producer thread.

In further implementations the counter is a deallocation counter. A deallocation counter computes the difference between the number of memory blocks deallocated by a particular thread and the number of memory blocks allocated to that thread. In other words, the deallocation counter equals the number of deallocated blocks minus the number of allocated blocks. In case of a deallocation counter, when a thread (e.g., thread 102a) deallocates (or allocates) one or more memory blocks, the allocation counter increases (or decreases) its value by the number of memory blocks involved. In this case a thread is identified as a consumer thread when the deallocation counter of that thread falls below the consumer threshold, and a thread is identified as a producer thread when the deallocation counter of that thread exceeds the producer threshold.

In accordance with some implementations, the threads 102 are mapped to their respective rates of deallocation with a production rate mapping. A production rate mapping maps a particular thread 102 to the rate of deallocation of that thread. The production rate mapping can be implemented, for example, by a production rate table 120. The production rate table 120 contains identifiers for the threads 102a-f and the corresponding deallocation rates.

Alternatively, the threads 102 are mapped to their respective rates of allocation with a consumption rate mapping or to their respective rates of memory usage with a memory usage rate mapping. A consumption rate mapping maps a particular thread (e.g. 102a) to the rate of allocation of that thread. A memory usage rate mapping maps a particular thread (e.g.

102a) to the rate of memory usage of that thread. In these cases the production rate table 120 contains the rates of allocation or the rates of memory usage of the corresponding threads.

The production rate table 120 is updated to keep the rates recorded in the table current. In some implementations the table is updated at regular time intervals. In other implementations the updates of the production rate table 120 are triggered by a particular event, e.g. allocation event or deallocation event performed by one of the threads 102. When a thread is identified as a producer thread or a consumer thread, it can be marked in the production rate table 120 accordingly. Other techniques for implementing the production rate mapping are possible.

If the memory blocks are allocated or deallocated in portions of different sizes, separate production rate tables are maintained for different size classes of the memory block portions.

When at least one consumer thread (e.g. 102b) and at least one producer thread (e.g. 102a) are identified, a dedicated channel (e.g., 116a) is established between these threads. Usually a dedicated channel is a heap containing unused memory blocks deallocated by the producer thread and waiting to be allocated to the consumer thread. Other types of channels are possible.

In some implementations, in order to identify a producer thread, the production rate table 120 is sorted and the thread having the highest deallocation rate (or the lowest allocation rate) is identified as a top producer thread. This top producer thread is selected to be the producer thread for the channel being established.

Similarly, in order to identify a consumer thread, the production rate table 120 is sorted and the thread having the lowest deallocation rate (or the highest allocation rate) is identified as a top consumer thread. This top consumer thread is selected to be the consumer thread for the channel being established.

In further implementations, both the top producer thread and the top consumer thread are identified and both are used in establishing the dedicated channel.

Usually, the dedicated channel is established by a channel manager. A channel manager 118 is a software component of the process 100 that is configured to be used by the threads 102 to allocate and deallocate memory blocks directly between producer threads and consumer threads.

When the channel manager 118 identifies at least one producer thread (e.g., 102a) and at least one consumer thread (e.g., 102d), the channel manager 118 establishes a channel (e.g., 116a) with the producer thread feeding memory blocks into the channel and the consumer thread receiving memory blocks from the channel. By way of illustration, after the channel 116a is established, when the consumer thread 102d needs additional memory, the thread 102d sends a request 121d to the channel 116a. In response, the channel 116a allocates one of the memory blocks from the channel 116a to the thread 102d. When the thread 102a no longer needs a particular memory block, it sends a request 121a to the channel 116a. In response, the channel 116a deallocates that memory block from the thread 102a to the channel 116a. In other implementations the allocation and deallocation of memory blocks between the producer thread and the consumer thread through the channel is mediated by the channel manager 118.

In some implementations when the producer thread and the consumer thread are identified, a new channel is established. In other implementations there is a preexisting pool of channels, and, when a new pair of producer and consumer threads is identified, the system identifies an unassigned channel and establishes direct allocation and deallocation relationship between the producer and consumer threads through this unassigned existing channel.

Sometimes the channel has a number of entries for placing multiple memory blocks. When the system utilizes channel entries, the producer thread deallocates memory blocks to an entry until the entry is full. When the entry is full, memory blocks deallocated to this entry by the producer thread become available to the consumer thread for memory block allocation. While the entry is not full but has some memory blocks deallocated to it by the producer thread, the memory blocks in this entry are not accessible to the consumer thread. Similarly, when the consumer thread deallocates memory blocks from the entry, this entry cannot be used by the producer thread for deallocation.

In some implementations the lengths of entries vary from one entry to another. To reduce latency of the memory blocks deallocated to the unfilled entries, it is beneficial to have lengths of channel entries grow in geometric progression up to a predetermined maximum length (e.g., 1, 2, 4, 8, 16, 32, 32, 32 . . . ).

In this case, the producer thread deallocates memory blocks to the channel entries starting from the first and shortest empty channel entry. If the first channel entry is full or inaccessible (e.g., in use by the consumer thread), the producer thread checks the next shortest channel entry and, if it is not full, deallocates its unused memory blocks to this channel entry. When the consumer thread needs to allocated memory blocks from the channel, it also first checks the shortest channel entry. If the shortest channel entry is empty or inaccessible (e.g., in use by the producer thread), the consumer thread checks the next shortest channel entry.

For each of the channels 116 the system computes a transfer rate. The transfer rate of a channel is the rate at which the cannel receives deallocated memory blocks from the corresponding producer thread. In some implementations a transfer rate of a channel is the rate at which the channel allocates memory blocks to the corresponding consumer thread.

Where the rate of allocation is used to identify the consumer and producer threads, the system decreases the rate of allocation for the corresponding consumer thread and increases the rate of allocation for the corresponding producer thread by the transfer rate of the corresponding channel. Where the rate of deallocation is used to identify the consumer and producer threads, when a channel is established, the system decreases the rate of deallocation for the producer thread corresponding to the channel by the value of the transfer rate of the channel, and increases the rate of deallocation for the consumer thread by the transfer rate of this channel.

By way of example, when the channel 116a is established and its transfer rate is calculated, the rate of allocation of the producer thread 102a is increased by this transfer rate and the rate of allocation of the consumer thread 102d is decreases by the same transfer rate.

In accordance with some implementations the channels 116 are mapped to their respective consumer threads, producer threads, and transfer rates with a channel mapping. The channel mapping can be implemented by a channel table 122, for example. The channel table contains identifiers for the channels 116a-c, identifiers for their corresponding producer threads and consumer threads, and the values of the corresponding transfer rates. The channel table is updated when the transfer rate for one of the channels changes. Subsequently, when the channel table 122 is updated, the corresponding entries for the affected threads in the production rate table 120 are adjusted accordingly. Other techniques for implementing the channel mapping are possible.

In various implementations the channel manager 118 is capable of identifying non-active channels and terminating the relationships between the channel and the corresponding consumer and producer threads. A channel is non-active when it does not serve its purpose of direct allocation and deallocation between consumer and producer threads. A channel connecting a first producer thread and a first consumer thread is terminated when the system no longer directs the first producer thread to deallocate memory blocks to the channel and the first consumer thread to seek additional memory blocks from the channel. When the channel is terminated, the corresponding entries in the production rate table 120 and in the channel table 122 are adjusted accordingly.

When the channel's connection with the first consumer thread and the first producer thread is terminated, this channel usually can be reused to enable direct allocation and deallocation between a different pair of consumer and producer threads.

In some implementations both the consumer thread and the producer thread can identify the channel as non-active. When a producer thread or a consumer thread is terminated, the corresponding channel is marked as non-active. When the consumer thread does not get allocated memory blocks from the channel for a first predetermined period of time, the consumer thread identifies this channel as non-active. This can happen when the consumer thread changes its behavior and no longer needs memory blocks to be allocated from the channel, or if the channel is empty for the first predetermined period of time.

When the producer thread does not deallocate memory blocks to the channel for a second predetermined period of time, the producer thread identifies this channel as non-active. This can happen when, for example, the producer thread changes its behavior and no longer needs to deallocate memory blocks to the channel or if the channel is full and cannot accept any more memory blocks for the second predetermined period of time. The first predetermine period of time and the second predetermined period of time can be the same length. When the channel is marked as non-active both by its producer thread and its consumer thread, this channel is identified as terminated. If at the time the channel is identified as terminated the channel is not empty, the memory blocks remaining in the channel heap are returned to the global heap 108.

Figure 2:
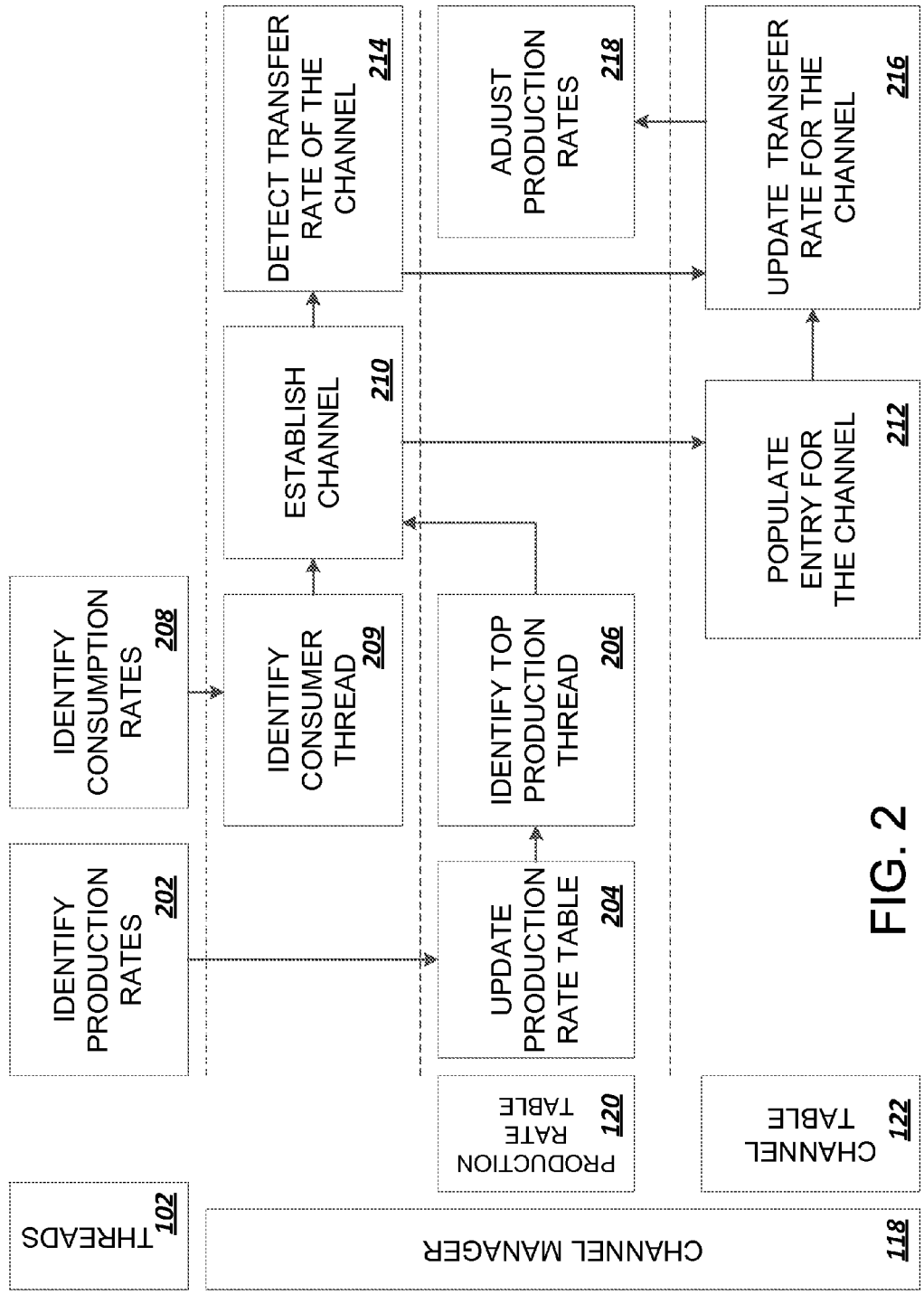
FIG. 2 illustrates an example system for distributed memory allocation for producer and consumer patterns.

FIG. 2 illustrates an example system for distributed memory allocation for producer and consumer patterns. The threads 102a-f use the buffers 112a-f to calculate their individual production rates (202). The channel manager 118 maps the calculated production rates to the corresponding threads 102a-f by way of the production table 120 (204). The production rates in the production table 120 are processed by the channel manger 118 to identify the thread having the highest production rate. If this highest production rate is above the producer threshold, the corresponding thread is marked a top production thread (206).

Also, the threads 102a-f use the buffers 112a-f to calculate their own consumption rates (208). The channel manager analyzes the calculated consumption rates to identify a thread with the production rate below the consumer threshold. This thread is marked as a consumer thread (209).

In some implementations, the channel manager analyzes the calculated production rates to identify the lowest production rate. If the lowest production rate is below the consumer threshold, the corresponding thread is marked a consumer thread.

Based on the identified top producer thread and the identified consumer thread, the channel manager 118 establishes a dedicated channel between these two threads (210). When the dedicated channel is established the top producer thread deallocates memory blocks directly to the dedicated channel, and when the consumer thread needs more memory blocks, they are allocated to the consumer thread from the dedicated channel.

When the dedicated channel is established, the channel manager updates the channel table 122 to reflect this event (212). The channel table 122 is updated with the identifiers for the top producer thread and the consumer thread associated with the dedicated channel.

In various implementations, the channel manager 118 detects transfer rate of the dedicated channel (214), and uses the detected transfer rate to update the channel table 122 (216). Then the channel manager 118 adjusts the production rate table 120 based on the changes to the channel table 122 (218). The rate of deallocation is decreased by the transfer rate of the corresponding dedicated channel for the top producer thread and increased by the same value for the consumer thread.

When the adjustments to the production table are made, the adjusted production rates are reevaluated to identify the next top producer thread and to establish the next dedicated channel.

Figure 3:
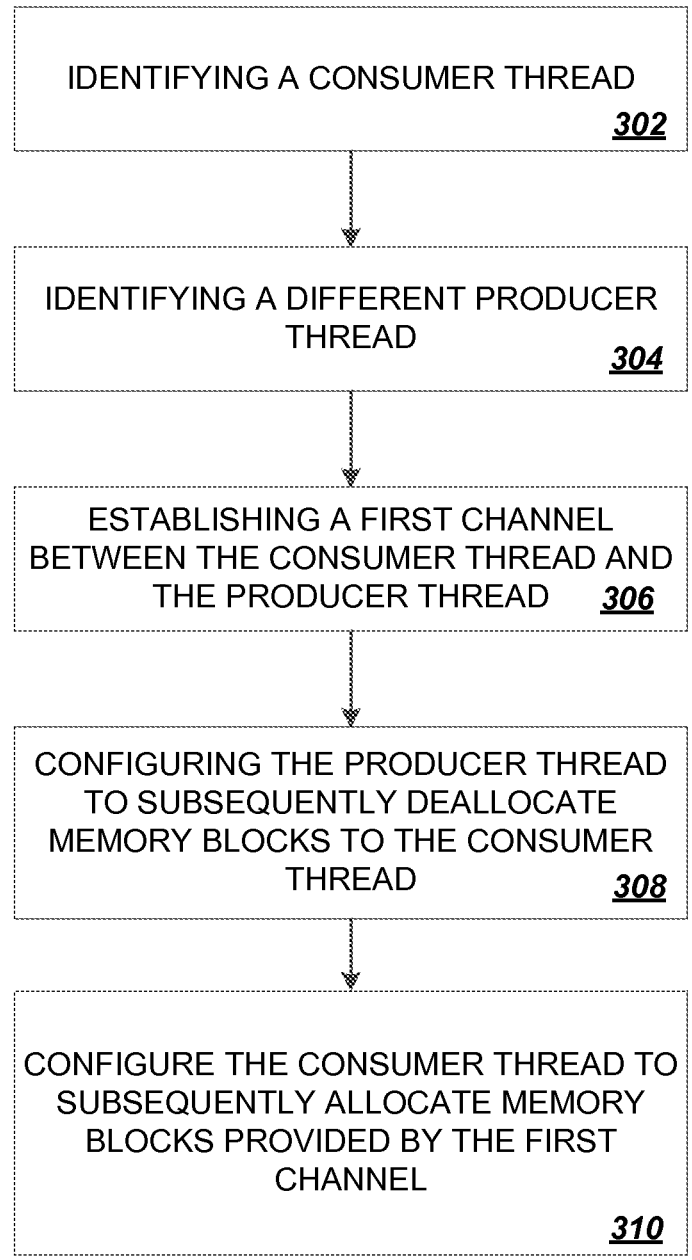
FIG. 3 illustrates a flow diagram of an example process for distributed memory allocation for producer and consumer patterns.

FIG. 3 illustrates a flow diagram of an example process for distributed memory allocation for producer and consumer patterns. The process can be performed by, for example, one or more data processing apparatus.

In step 302, a consumer thread (e.g. 102b) is identified. In step 304, a producer thread (e.g. 102a) is identified. Various methods can be used to identify a consumer thread and a producer thread. Some techniques that can be used to identify the consumer thread and the producer thread are described with regard to FIG. 1 and FIG. 2.

In step 306, a channel (e.g. 116a) is established between the identified consumer thread and producer thread. Accordingly, an entry in the channel table 122 corresponding to the channel is updated with the identifiers for the producer thread and the consumer thread. In some embodiments when the channel is established, a new entry corresponding to this channel is created in the channel table 122.

In steps 308 the producer thread 102a is configured to deallocate memory blocks to the consumer thread 102b. When the producer thread has in its heap a memory block it no longer needs, the producer thread 102a first attempts to deallocate this memory block to the channel 116a. If the channel 116a is full, the producer 102a thread deallocates this memory block to the GMM 104.

In step 310, the consumer thread 102a is configured to allocate memory blocks provided by the channel 116a. When the consumer thread 102a needs an additional memory block, it first sends memory allocation request 121b to the channel manager 118. If the channel 116a corresponding to the consumer thread 102a has memory blocks for allocation, the channel manager 118 allocates a memory block from the channel 116a to the consumer thread 102a. If the channel 116a is empty, the allocation request is turned to GMM 104.

Figure 4:
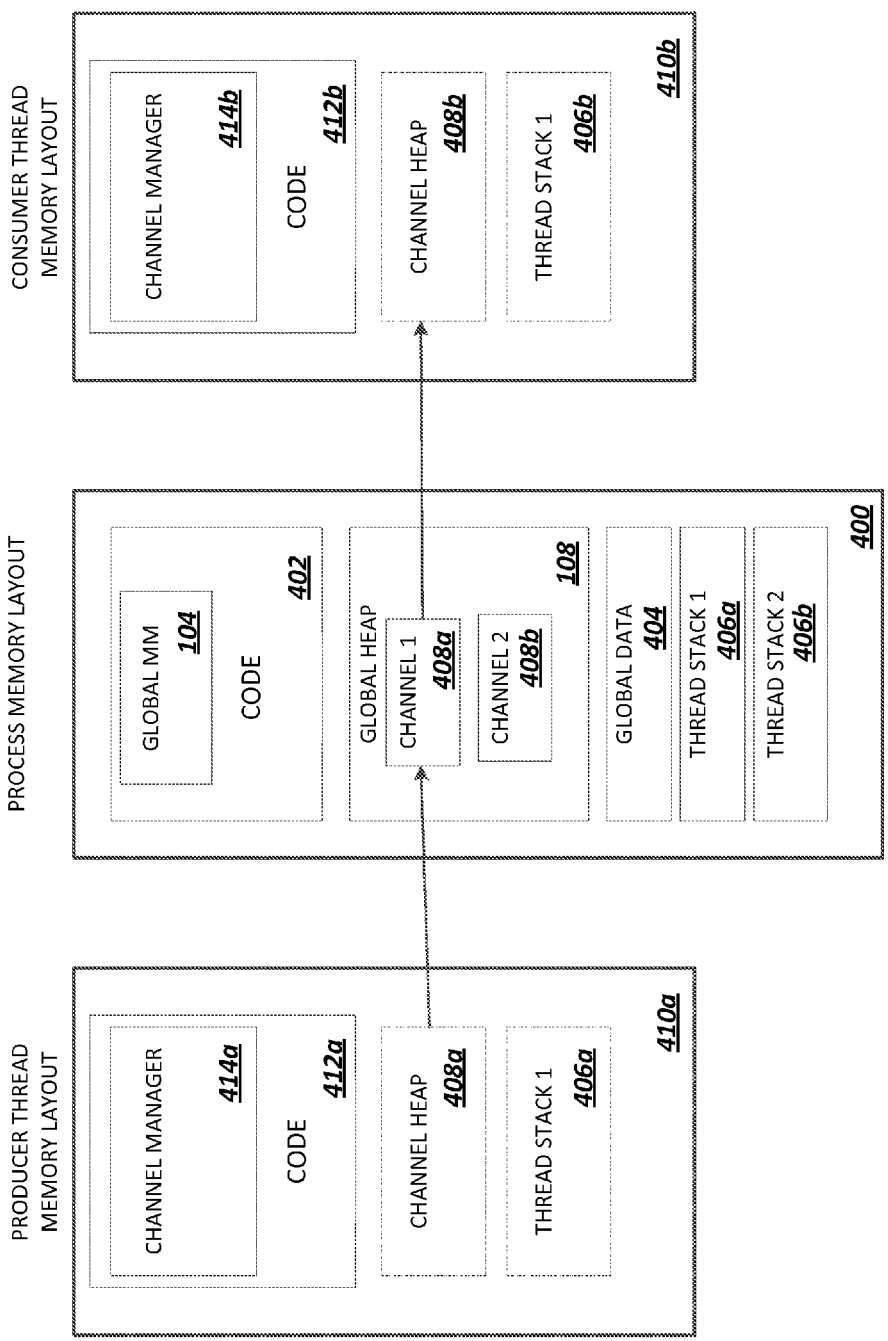
FIG. 4 illustrates an example memory layout for a process that uses distributed memory allocation for consumer and producer threads and example memory layouts for the individual threads.

FIG. 4 illustrates an example memory layout for a process that uses distributed memory allocation for consumer and producer threads and example memory layouts for the individual threads.

Process memory 400 used by the multi-threaded process 100 includes process code 402, a global heap 108, global data 404, and stacks 406a-b for individual threads 102a-b. The process code 402 includes computer software instructions for implementing the GMM 104. The global heap 108 includes separate heaps 408a-b for individual channels 116a-b.

Thread memory (e.g. 410a) is used exclusively by the corresponding threads (e.g. 102a). The thread memory 410 includes a thread code (e.g. 412a) which comprises computer software instructions for implementing the logic of the thread. Also, the thread (e.g. 102a) has access to some portions of the global heap 108. The thread (e.g. 102a) gains access to memory blocks in the global heap 108 by sending an allocation request to the GMM 104 and receiving from GMM 104 addresses of memory blocks in the global heap 108 that have been allocated for the thread's exclusive use. The thread (e.g. 102a) also has access to its corresponding thread stack (e.g. 406a). The thread stack (406a) is reserved for exclusive use by the corresponding thread (e.g. 102a).

In some implementations the thread code portions 412a-b include computer software instructions that implement the channel manager components 414a-b. By way of illustration, if the thread 102a is identified as a producer thread, and the thread 102b is identified as a consumer thread, the first channel 116a is established to provide direct allocation and deallocation between these two threads. After the channel 116a is established, the channel manager 414a of the producer thread 102a directs the unused memory blocks to be deallocated to the first channel heap 408a. Likewise, when the consumer thread 102b needs additional memory blocks, its channel manager 414b directs the thread to request these additional memory blocks from the first channel heap 408a.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising: executing a process on the data processing apparatus wherein the process comprises a plurality of threads and a global memory manager, wherein the global memory manager is configured to process requests from threads of the plurality of threads to allocate and deallocate memory blocks within the process;

identifying a consumer thread of the plurality of threads wherein the consumer thread allocates more memory blocks using the global memory manager than the thread deallocates using the global memory manager, wherein a difference between measures of memory block allocation and deallocation for the consumer thread is beyond a first threshold, wherein identifying the consumer thread comprises:

selecting two or more threads of the plurality of threads that each have a respective measure of memory block allocation using the global memory manager that is greater than a respective measure of memory block deallocation using the global memory manager;

determining a respective consumption rate for each of the selected threads as the difference between the thread's respective measures over time; and identifying as the consumer thread the selected thread having a highest respective consumption rate;

identifying a different producer thread of the plurality of threads wherein the producer thread deallocates more memory blocks using the global memory manager than the thread allocates using the global memory manager, wherein a difference between measures of memory block deallocation and allocation for the producer thread is beyond a second threshold;

based on identifying the consumer and producer threads, establishing a first channel between the consumer thread and the producer thread through which references to deallocated memory blocks of the producer thread can be sent to the consumer thread;

configuring the producer thread to subsequently deallocate memory blocks by sending references to the memory blocks to the consumer thread using the first channel instead of using the global memory manager to deallocate the memory blocks; and configuring the consumer thread to subsequently allocate memory blocks using the references to the memory blocks provided on the first channel by the producer thread instead of using the global memory manager to allocate the memory blocks.

2. The method of claim 1 wherein the memory blocks within the process are fixed length or variable length.

3. The method of claim 1, further comprising:
  determining a respective measure of memory block deallocation for one or more threads of the plurality of threads; and
  determining a respective measure of memory block allocation for one or more threads of the plurality of threads.

4. The method of claim 1 wherein the measure of memory block deallocation of a thread is a number of memory blocks deallocated by the thread; and
  wherein the measure of memory block allocation of the thread is a number of memory blocks allocated by the thread.

5. The method of claim 4, further comprising determining a transfer rate of the first channel as a rate of memory block allocation from the producer thread to the consumer thread using the first channel.

6. The method of claim 1 wherein the measure of memory block deallocation of a thread is a difference between a number of memory blocks deallocated by the thread and a number of memory blocks allocated by the thread; and
  wherein the measure of memory block allocation of the thread is a difference between a number of memory blocks allocated by the thread and a number of memory blocks deallocated by the thread.

7. The method of claim 1 wherein the measure of memory block deallocation of a thread is a rate of memory block deallocation of the thread; and wherein the measure of memory allocation of the thread is a rate of memory block allocation of the thread.

8. The method of claim 1 wherein the measures of memory block deallocation and allocation of a thread are respectively rates of memory block allocation and deallocation of the thread.

9. The method of claim 1 wherein identifying the producer thread comprises:
  selecting two or more threads of the plurality of threads that each have a respective measure of memory block deallocation using the global memory manager that is greater than a respective measure of memory block allocation using the global memory manager;
  determining a respective production rate for each of the selected threads as the difference between the thread's respective measures over time; and
  identifying as the producer thread the selected thread having a highest respective production rate.

10. A system comprising
  a machine-readable storage device having instructions stored thereon; and
  data processing apparatus operable to execute the instructions to perform operations comprising:
  executing a process on the data processing apparatus wherein the process comprises a plurality of threads and a global memory manager, wherein the global memory manager is configured to process requests from threads of the plurality of threads to allocate and deallocate memory blocks within the process;
  identifying a consumer thread of the plurality of threads wherein the consumer thread allocates more memory blocks using the global memory manager than the thread deallocates using the global memory manager, wherein a difference between measures of memory block allocation and deallocation for the consumer thread is beyond a first threshold, wherein identifying the consumer thread comprises:
    selecting two or more threads of the plurality of threads that each have a respective measure of memory block allocation using the global memory manager that is greater than a respective measure of memory block deallocation using the global memory manager;
    determining a respective consumption rate for each of the selected threads as the difference between the thread's respective measures over time; and
    identifying as the consumer thread the selected thread having a highest respective consumption rate;
  identifying a different producer thread of the plurality of threads wherein the producer thread deallocates more memory blocks using the global memory manager than the thread allocates using the global memory manager, wherein a difference between measures of memory block deallocation and allocation for the producer thread is beyond a second threshold;
  based on identifying the consumer and producer threads, establishing a first channel between the consumer thread and the producer thread through which references to deallocated memory blocks of the producer thread can be sent to the consumer thread;
  configuring the producer thread to subsequently deallocate memory blocks by sending references to the memory blocks to the consumer thread using the first channel instead of using the global memory manager to deallocate the memory blocks; and
  configuring the consumer thread to subsequently allocate memory blocks using the references to the memory blocks provided on the first channel by the producer thread instead of using the global memory manager to allocate the memory blocks.

11. The system of claim 10 wherein the memory blocks within the process are fixed length or variable length.

12. The system of claim 10, wherein the operation further comprise:
  determining a respective measure of memory block deallocation for one or more threads of the plurality of threads; and
  determining a respective measure of memory block allocation for one or more threads of the plurality of threads.

13. The system of claim 10 wherein the measure of memory block deallocation of a thread is a number of memory blocks deallocated by the thread; and
  wherein the measure of memory block allocation of the thread is a number of memory blocks allocated by the thread.

14. The system of claim 13, wherein the operations further comprise determining a transfer rate of the first channel as a rate of memory block allocation from the producer thread to the consumer thread using the first channel.

15. The system of claim 10 wherein the measure of memory block deallocation of a thread is a difference between a number of memory blocks deallocated by the thread and a number of memory blocks allocated by the thread; and
  wherein the measure of memory block allocation of the thread is a difference between a number of memory blocks allocated by the thread and a number of memory blocks deallocated by the thread.

16. The system of claim 10 wherein the measure of memory block deallocation of a thread is a rate of memory block deallocation of the thread; and wherein the measure of memory allocation of the thread is a rate of memory block allocation of the thread.

17. The system of claim 10 wherein the measures of memory block deallocation and allocation of a thread are respectively rates of memory block allocation and deallocation of the thread.

18. The system of claim 10 wherein identifying the producer thread comprises:
- selecting two or more threads of the plurality of threads that each have a respective measure of memory block deallocation using the global memory manager that is greater than a respective measure of memory block allocation using the global memory manager;
- determining a respective production rate for each of the selected threads as the difference between the thread's respective measures over time; and
- identifying as the producer thread the selected thread having a highest respective production rate.

19. A storage device having instructions stored thereon that, when executed by data processing apparatus, cause the data processing apparatus to perform operations comprising:
- executing a process on the data processing apparatus wherein the process comprises a plurality of threads and a global memory manager, wherein the global memory manager is configured to process requests from threads of the plurality of threads to allocate and deallocate memory blocks within the process;
- identifying a consumer thread of the plurality of threads wherein the consumer thread allocates more memory blocks using the global memory manager than the thread deallocates using the global memory manager, wherein a difference between measures of memory block allocation and deallocation for the consumer thread is beyond a first threshold, wherein identifying the consumer thread comprises:
  - selecting two or more threads of the plurality of threads that each have a respective measure of memory block allocation using the global memory manager that is greater than a respective measure of memory block deallocation using the global memory manager;
  - determining a respective consumption rate for each of the selected threads as the difference between the thread's respective measures over time; and
  - identifying as the consumer thread the selected thread having a highest respective consumption rate;
- identifying a different producer thread of the plurality of threads wherein the producer thread deallocates more memory blocks using the global memory manager than the thread allocates using the global memory manager, wherein a difference between measures of memory block deallocation and allocation for the producer thread is beyond a second threshold;
- based on identifying the consumer and producer threads, establishing a first channel between the consumer thread and the producer thread through which references to deallocated memory blocks of the producer thread can be sent to the consumer thread;
- configuring the producer thread to subsequently deallocate memory blocks by sending references to the memory blocks to the consumer thread using the first channel instead of using the global memory manager to deallocate the memory blocks; and
- configuring the consumer thread to subsequently allocate memory blocks using the references to the memory blocks provided on the first channel by the producer thread instead of using the global memory manager to allocate the memory blocks.

20. The storage device of claim 19 wherein the memory blocks within the process are fixed length or variable length.

21. The storage device of claim 19, wherein the operations further comprise:
- determining a respective measure of memory block deallocation for one or more threads of the plurality of threads; and
- determining a respective measure of memory block allocation for one or more threads of the plurality of threads.

22. The storage device of claim 19 wherein the measure of memory block deallocation of a thread is a number of memory blocks deallocated by the thread; and
- wherein the measure of memory block allocation of the thread is a number of memory blocks allocated by the thread.

23. The storage device of claim 22, wherein the operations further comprise determining a transfer rate of the first channel as a rate of memory block allocation from the producer thread to the consumer thread using the first channel.

24. The storage device of claim 19 wherein the measure of memory block deallocation of a thread is a difference between a number of memory blocks deallocated by the thread and a number of memory blocks allocated by the thread; and
- wherein the measure of memory block allocation of the thread is a difference between a number of memory blocks allocated by the thread and a number of memory blocks deallocated by the thread.

25. The storage device of claim 19 wherein the measure of memory block deallocation of a thread is a rate of memory block deallocation of the thread; and wherein the measure of memory allocation of the thread is a rate of memory block allocation of the thread.

26. The storage device of claim 19 wherein the measures of memory block deallocation and allocation of a thread are respectively rates of memory block allocation and deallocation of the thread.

27. The storage device of claim 19 wherein identifying the producer thread comprises:
- selecting two or more threads of the plurality of threads that each have a respective measure of memory block deallocation using the global memory manager that is greater than a respective measure of memory block allocation using the global memory manager;
- determining a respective production rate for each of the selected threads as the difference between the thread's respective measures over time; and
- identifying as the producer thread the selected thread having a highest respective production rate.

* * * * *